United States Patent [19]

Byron

[11] Patent Number: 4,761,050

[45] Date of Patent: Aug. 2, 1988

[54] OPTICAL SWITCHING DEVICE INCLUDING POLARIZATION PRESERVING COUPLER UTILIZING KERR EFFECT AND METHOD OF USING SAME

[75] Inventor: Kevin C. Byron, Bishop's Stortford, England

[73] Assignee: STC PLC, London, England

[21] Appl. No.: 55,074

[22] Filed: May 28, 1987

[30] Foreign Application Priority Data

Jun. 7, 1986 [GB] United Kingdom ............... 8613895

[51] Int. Cl.$^4$ ......................... G02B 6/26; H01S 3/115
[52] U.S. Cl. ............................. 350/96.15; 350/96.16; 350/96.18; 350/96.29; 350/320; 350/370; 350/374; 372/12; 372/27
[58] Field of Search ............... 350/96.15, 96.13, 96.16, 350/96.14, 96.20, 96.18, 96.29, 96.19, 96.30, 320, 370, 374, 375, 355, 356; 372/6, 12, 10, 21, 27

[56] References Cited

U.S. PATENT DOCUMENTS

| 3,611,231 | 10/1971 | Burke ................... 372/12 X |
| 3,914,710 | 10/1975 | Young ...................... 372/12 |
| 4,265,543 | 5/1981 | Barclay et al. ............. 350/375 X |
| 4,331,387 | 5/1982 | Wentz ................... 372/12 X |
| 4,441,186 | 4/1984 | Erickson ................ 372/12 X |
| 4,515,431 | 5/1985 | Shaw et al. ............... 350/96.15 |
| 4,546,476 | 10/1985 | Shaw et al. ............... 350/96.15 |
| 4,553,238 | 11/1985 | Shaw et al. ............... 350/96.15 |
| 4,554,510 | 11/1985 | Shaw et al. ............... 350/96.15 |
| 4,591,372 | 5/1986 | Bricheno et al. .......... 350/96.15 |
| 4,644,556 | 2/1987 | Petuchowski et al. ...... 350/96.29 |
| 4,694,243 | 9/1987 | Miller et al. ................ 350/370 |
| 4,720,160 | 1/1988 | Hicks, Jr. ................ 350/96.15 |
| 4,720,162 | 1/1988 | Mochizuki et al. ........ 350/96.15 |
| 4,723,824 | 2/1988 | Shaw et al. ............... 350/96.15 |

FOREIGN PATENT DOCUMENTS

| 58-205102 | 11/1983 | Japan ................... 350/96.13 |
| 59-78322 | 5/1984 | Japan ................... 350/96.14 |
| 60-242435 | 12/1985 | Japan ................... 350/96.15 |
| 2170920 | 8/1986 | United Kingdom ........ 350/96.15 |

OTHER PUBLICATIONS

Optics Letters, vol. 11, No. 1, Jan. 1986, B. Daino et al., p. 42-44, "New All-Optical Devices Based on Third-Order Nonlinearity of Birefrigent Fibers.
Koester et al., "Amplification in a Fiber Laser", Applied Optics, vol. 3, No. 10, 10/64, pp. 1182-1186.

Primary Examiner—William L. Sikes
Assistant Examiner—Brian M. Healy
Attorney, Agent, or Firm—Lee & Smith

[57] ABSTRACT

An optical crossbar switch employs the optical Kerr effect to cause switching of an input signal between two possible outputs. In the absence of a pump signal the output is on one fibre. In the presence of a pump signal the output is on the other fibre. The pump signal serves to produce rotation of the polarization of the input signal in a polarization maintaining coupler, the two possible polarization states being separated by a birefringent crystal or a polarization selective beam splitter.

6 Claims, 1 Drawing Sheet

OPTICAL SWITCHING DEVICE INCLUDING POLARIZATION PRESERVING COUPLER UTILIZING KERR EFFECT AND METHOD OF USING SAME

BACKGROUND OF THE INVENTION

This invention relates to optical switching and in particular to an optical crossbar switch.

SUMMARY OF THE INVENTION

According to one aspect of the present invention there is provided an optical switch comprising an input for an optical signal, an input for a pump optical signal and first and second outputs, a polarisation maintaining coupler to which the two inputs are coupled and means for spatially separating two polarisation states disposed intermediate an output of the coupler and the first and second outputs, wherein in the absence of the pump signal said optical signal is coupled to the first output and wherein in the presence of a pump signal rotation of the polarisation of said optical signal is caused and the optical signal with the rotated polarisation state coupled to the second output.

According to another aspect of the present invention there is provided a method of switching an input optical signal between either of two outputs comprising the steps of applying the input optical signal to a polarisation maintaining coupler to which can be input a pump optical signal and applying the output of the coupler to means for spatially separating two polarisation states, whereby in the absence of the pump optical signal the coupler output is applied to one said output and in the presence of the pump optical signal rotation of the polarisation of the input optical signal is caused and the optical signal with the rotated polarisation state is applied to the other said output.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
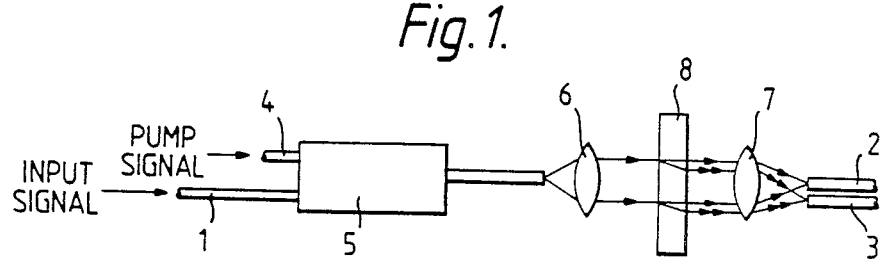
FIG. 1 illustrates, schematically, a first embodiment of an optical crossbar switch.

Referring firstly to FIG. 1, it is required to switch an applied input optical signal input on fibre 1 between first and second output optical fibres 2 and 3 in dependence on the occurrence of a particular event, which corresponds in the arrangement of FIG. 1 to the presence of a pump signal on fibre 4. When the pump signal is not present, i.e. "off", the input signal is to be coupled to fibre 2 whereas when the pump signal is present, i.e. "on", the input signal is to be coupled to fibre 3.

The input signal, which is a polarised signal, and the pump signal are applied to a polarisation maintaining coupler 5. In the absence of the pump signal the input signal will be transmitted through the coupler 5 without being affected thereby and applied to the first fibre 2, the optical system consisting of lenses 6 and 7 and a birefringent crystal 8 and serving in this case merely to focus the transmitted input signal onto the first output fibre 2, the birefringent crystal 8 having no effect thereon.

In the case of the presence of the input signal and the pump signal, the optical Kerr effect in the coupler serves to rotate the polarisation of the input signal from its initial polarisation state to the orthogonal polarisation state. This assumes that the pump signal power is sufficient to cause the Kerr effect to be obtained. At sufficiently high power levels polarisation rotation in the coupler occurs because of refractive index non-linearity due to the optical Kerr effect. The two possible polarisation states then pertaining, the original polarisation state of the input signal and the Kerr effect rotated orthogonal polarisation state, are spatially separated by passage through the birefringent crystal 8 and the rotated state input signal is in this case applied to the second output fibre 3. In order to prevent that portion, if any, of the transmitted signal with the original polarisation state, which portion will be of low intensity, being simultaneously applied to the first output fibre 2, a polariser may be disposed between crystal 8 and lens 7, which polariser is arranged to block low intensity signals. The polarisation of the input signal may, for example, be linear or circular.

Figure 2:
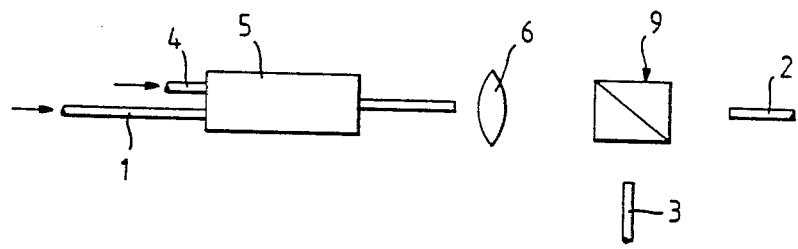
FIG. 2 illustrates, schematically, a second embodiment of an optical crossbar switch.

As an alternative to using a birefringent crystal to spatially separate the two polarisation states, a polarisation selective beamsplitter 9 may be employed as illustrated in FIG. 2.

The optical crossbar switches described above are all optical devices capable of operation at very high speeds, for example approximately 1 psec. in view of the use of the optical Kerr effect. The birefringent crystal may be of Calcite.

The FIG. 1 arrangement is particularly useful for switching between optical fibres since the birefringent crystal deflects the signal sufficiently for switching between two closely adjacent parallely-disposed fibres of currently employed dimensions, thus minimising the dimensions of the overall switch.

The polarisation maintaining coupler may, for example, be comprised by a fused single mode fibre directional coupler produced using a differential pulling technique, as described in GB No. 2170920 A. A particular compact high speed optical switch is achieved by integrating the polarisation maintaining coupler and the polarisation separating element into a single integrated optic structure.

I claim:

1. An optical switch comprising an input for an optical signal, an input for a pump optical signal and first and second outputs, a polarisation maintaining coupler to which the two inputs are coupled and means for spatially separating two polarisation states disposed intermediate an output of the coupler and the first and second outputs, wherein in the absence of the pump signal said optical signal is coupled to the first output and wherein in the presence of a pump signal rotation of the polarisation of said optical signal is caused and the optical signal with the rotated polarisation state coupled to the second output.

2. An optical switch as claimed in claim 1, wherein the means for spatially separating two polarisation states includes a birefringent crystal.

3. An optical switch as claimed in claim 1, wherein the means for spatially separating two polarisation states is comprised by a polarisation selective beam splitter.

4. A method of switching an input optical signal between either of two outputs, comprising the steps of applying the input optical signal to a polarisation maintaining coupler to which can be input a pump optical signal and applying the output of the coupler to means for spatially separating two polarisation states, whereby in the absence of the pump optical signal the coupler output is applied to one said output and in the presence of the pump optical signal rotation of the polarisation of the input optical signal is caused and the optical signal with the rotated polarisation state is applied to the other said output.

5. A method as claimed in claim 4 including the step of applying the output of the coupler to a birefringent crystal for spatially separating said two polarisation states.

6. A method as claimed in claim 4 including the step of applying the output of the coupler to a polarisation selective beam splitter for spatially separating said two polarisation states.

* * * * *